(12) United States Patent
Hölzl et al.

(10) Patent No.: US 8,106,373 B2
(45) Date of Patent: Jan. 31, 2012

(54) APPARATUS FOR READING OUT X-RAY INFORMATION STORED IN STORAGE PHOSPHOR PLATES

(75) Inventors: Johannes Hölzl, Grasbrunn (DE); Günther Schindlbeck, Munich (DE); Volkmar Voigtländer, Eichenau (DE); Thomas Hartmann, Uffing am Staffelsee (DE); Franz Auer, Rottenburg (DE); Rudolf Werkstetter, Perach (DE)

(73) Assignee: Agfa HealthCare N.V., Mortsel (BE)

( * ) Notice: Subject to any disclaimer, the term of this patent is extended or adjusted under 35 U.S.C. 154(b) by 310 days.

(21) Appl. No.: 12/171,543

(22) Filed: Jul. 11, 2008

(65) Prior Publication Data

US 2009/0294706 A1  Dec. 3, 2009

(30) Foreign Application Priority Data

May 28, 2008 (EP) .................................. 08157101

(51) Int. Cl.
*G01T 1/105* (2006.01)
(52) U.S. Cl. ......... 250/580; 250/589; 250/584; 250/271
(58) Field of Classification Search .................. 250/589, 250/584, 580, 483.1, 361 R, 362, 365, 372, 250/458.1, 461.1; 198/340, 341.01, 373, 198/388, 401, 372
See application file for complete search history.

(56) References Cited

U.S. PATENT DOCUMENTS 4,893,011 A 1/1990 Bauer et al.
4,908,514 A 3/1990 Bauer et al.
(Continued)

FOREIGN PATENT DOCUMENTS

DE 3731203 A1 3/1989
(Continued)

OTHER PUBLICATIONS

European Search Report dated Jan. 27, 2009, from counterpart European Application No. 08157101.0, filed on May 28, 2008.

*Primary Examiner* — David Porta
*Assistant Examiner* — Yara Green
(74) *Attorney, Agent, or Firm* — Houston Eliseeva, LLP

(57) ABSTRACT

An apparatus (10) for reading out X-ray information stored in storage phosphor plates with an input unit, (12) for inputting a plurality of cassettes (14, 28, 32) which can be stacked one behind the other in a direction of stacking (S) within the input unit (12), has an oblong accommodation well (30) for accommodating one of the cassettes (32), the accommodation well (30) being adjacent to the input unit (12), a moving device (50) for horizontally moving the cassette (32) accommodated by the accommodation well (30) along a path of movement, and a deflection element (64, 66) for deflecting a next cassette located within the input unit (12) which is adjacent to the cassette (32) accommodated by the accommodation well (30) and projects at least partially into the path of movement, the deflection element (64, 66) being positioned and designed such that with horizontal movement of the cassette (32) located within the accommodation well (30), due to contact between the cassette (32) located within the accommodation well (30) and the next cassette (28) located within the input unit (12) a force is exerted upon the latter in the direction of stacking (S) and thus moves out of the path of movement.

15 Claims, 7 Drawing Sheets

U.S. PATENT DOCUMENTS

| | | |
|---|---|---|
| 5,530,259 A * | 6/1996 | Arakawa ........................ 250/584 |
| 7,256,413 B2 | 8/2007 | Muller et al. |
| 7,315,040 B2 | 1/2008 | Auer et al. |
| 7,399,986 B2 | 7/2008 | Heinz et al. |
| 2005/0260517 A1 | 11/2005 | Schindlbeck et al. |
| 2006/0131525 A1 * | 6/2006 | Kralles et al. ................. 250/589 |
| 2006/0131526 A1 | 6/2006 | Wendlandt |
| 2006/0131527 A1 | 6/2006 | Wendlandt et al. |
| 2007/0114448 A1 | 5/2007 | Pirmann et al. |
| 2007/0153968 A1 | 7/2007 | Holzl et al. |

FOREIGN PATENT DOCUMENTS

| | | |
|---|---|---|
| EP | 0 698 813 A1 | 2/1996 |
| JP | 04-042222 A | 2/1992 |

\* cited by examiner

APPARATUS FOR READING OUT X-RAY INFORMATION STORED IN STORAGE PHOSPHOR PLATES

RELATED APPLICATIONS

This application claims priority to European Patent Application No. EP08157101.0 filed on May 28, 2008, which is incorporated herein by reference in its entirety.

This application is related to application Ser. No. 12/171, 546, filed on Jul. 11, 2008 by Hoelzl, et al., which is incorporated herein by reference in its entirety.

BACKGROUND OF THE INVENTION

In the field of computer radiography (CR) an image is produced for medical purposes of an object, for example a patient or a body part of the patient, by means of X-ray radiation which is stored in a storage phosphor layer as a latent X-ray image. In order to read out the image information stored in the storage phosphor layer, the storage phosphor layer is stimulated by means of an irradiation device. As a result of this stimulation the storage phosphor layer emits emission radiation which has an intensity corresponding to the quantity of image information on the X-ray image stored in the storage phosphor layer. The emission radiation emitted by the storage phosphor layer is collected by a detector and converted into electrical signals which contain an image of the image information. The electrical signals are processed further, and the image information stored in the storage phosphor layer is then made visible. The image information can be displayed directly on a monitor, for example, or be written onto a photographic X-ray film by means of a printer used specifically for X-ray images.

An apparatus for reading out X-ray information stored in storage phosphor plates is known from US 2006/0131525 A1. This apparatus includes an input unit for inputting a number of cassettes which can be stacked one behind the other and with storage phosphor plates which are to be read out, and an output unit provided next to the input unit for outputting cassettes. A read-out unit is located within the apparatus beneath the output unit. In order to read out the storage phosphor plates located within the cassettes the cassettes input into the input unit are pushed into the output unit. Here the storage phosphor plate located within the respective cassette is removed from the latter and conveyed downwards into the read-out unit in order to be read out. The storage phosphor plate which has been read out is then conveyed back into the cassette and moved forwards with the latter within the output unit in order to make space for the next cassette to be read out.

With this apparatus the storage phosphor plate located within a subsequent cassette can only be read out in the read-out unit once the previous cassette which has already been read out has first of all been fully removed from the input region of the read-out unit located within the output unit, and the subsequent cassette has then been moved on from the input unit to the output unit. This can lead to undesired delays when processing individual cassettes or larger stacks of cassettes.

A further apparatus for reading out X-ray information stored in storage phosphor plates is known from US 2006/0131526 A1. With this apparatus the read-out unit is disposed between the input unit and the output unit. The cassettes are moved from the input unit horizontally towards the read-out unit. Here the storage phosphor plate located within the respective cassette is moved downwards to within the apparatus, is read out and moved back into the cassette which is finally moved from the read-out unit horizontally towards the output unit.

SUMMARY OF THE INVENTION

In the apparatus in which the read-out unit is disposed between the input unit and the output unit, due to the three-stage and therefore relatively long path of movement from the input unit to the read-out unit, and from the latter to the output unit, undesired delays can occur when processing both individual cassettes and large stacks of cassettes.

Moreover, with the apparatuses described above trouble-free movement of the cassettes cannot always be guaranteed.

It is an object of the present invention to specify an apparatus for reading out X-ray information stored in storage phosphor plates, wherein a reliable handling of cassettes, in which storage phosphor plates are located, is guaranteed.

The present invention relates to an apparatus for reading out X-ray information stored in storage phosphor plates with an input unit that can hold a plurality of cassettes, each holding a storage phosphor plate to be read out. The cassettes are stacked one behind the other in a direction of stacking in the input unit. An oblong accommodation well is further provided for accommodating one of the cassettes, the accommodation well being adjacent to the input unit and having an oblong input opening through which the storage phosphor plate, which is located in the cassette accommodated by the accommodation well, can be conveyed to within the apparatus. A moving device is provided for horizontally moving the cassette accommodated by the accommodation well along a path of movement.

In general according to one aspect, the invention features an apparatus for reading out X-ray information stored in storage phosphor plates. The apparatus comprises:

an input unit in which a plurality of cassettes, in which a storage phosphor plate to be read out is respectively located, can be stacked one behind the other in a direction of stacking, an oblong accommodation well for accommodating one of the cassettes, the accommodation well being adjacent to the input unit and having an oblong input opening through which the storage phosphor plate, which is located in the cassette accommodated by the accommodation well, can be conveyed to within the apparatus, a moving device for horizontally moving the cassette located within the accommodation well along a path of movement, and a deflection element for deflecting a next cassette, said next cassette being located within the input unit and projecting at least partially into the path of movement, the deflection element being positioned and/or designed such that by a horizontal movement of the cassette located within the accommodation well along the path of movement a force is exerted upon the next cassette in the direction of stacking due to a contact between the cassette located within the accommodation well and the next cassette projecting at least partially into the path of movement so that the latter is moved out of the path of movement.

The deflection element for deflecting at least one next cassette located within the input unit and which is adjacent to the cassette accommodated by the accommodation well projects at least partially into the path of movement. The deflection element is positioned and/or designed such that with horizontal movement of the cassette located within the accommodation well, due to contact between the cassette located within the accommodation well and the next cassette located within the input unit, a force or force component is exerted upon the next cassette in the direction of stacking so that the latter is moved out of the path of movement, and so clears the path of movement for trouble-free conveyance of the cassette conveyed within the accommodation well.

By means of the invention the conveyance of cassettes stacked in the input unit to the accommodation well and the movement of the cassette located within the accommodation well in a reliable and simple manner is guaranteed.

With the principle according to the invention the cassette accommodated by the accommodation well is moved by the moving device horizontally towards the input opening through which the storage phosphor plate located within the cassette can be conveyed from the cassette, which is open for this purpose, to within the apparatus. By stacking the plurality of cassettes within the input unit the path of movement of the cassette located within the accommodation well can if applicable be at least partially blocked by a cassette adjacent in the direction of stacking, i.e. the next cassette "in line" in the stack. This can happen in particular if the next cassette is pressed strongly towards the accommodation well by the weight of the other cassettes in the stack. By moving the cassette located within the accommodation well the latter therefore inevitably comes into contact with the next cassette and exerts a force upon it. Provided the next cassette is not already touching the deflection element, it is moved due to friction forces occurring between the cassettes together with the cassette located within the accommodation well up to the deflection element. If the next cassette then comes into contact with the deflection element, a further force is exerted upon the next cassette by the cassette located within the accommodation well in the horizontal direction. In the event that the next cassette is not aligned parallel to the cassette located within the accommodation well and projects into the path of movement of the latter, the next cassette is pressed against the deflection element by the force exerted in a horizontal direction and is moved out of the path of movement due to the positioning and/or form of the latter.

In this way the deflection element makes it possible to prevent the next cassette from becoming wedged or jammed, and in this way from impeding the conveyance of the cassette located within the accommodation well.

In one advantageous embodiment of the invention the deflection element is disposed in a region of a cross-over from the input unit to the accommodation well. In this way blocking of the path of movement is effectively prevented.

In a further advantageous embodiment the deflection element has a slanted guide region for guiding the next cassette located within the input unit in the direction of stacking. By means of this slanted guide region it is made possible, in a simple manner, for the next cassette to be moved out of the path of movement without jamming. Advantageously the slant of the guide region points towards the accommodation well.

In a particularly preferred embodiment of the invention the deflection element is disposed in a peripheral region of the accommodation well. In this way normal manipulation of the cassettes, in particular of the further cassettes located within the input unit, is not impeded by the deflection element. Advantageously the deflection element can be designed such that it constitutes a stop with which the cassette located within the accommodation well can be positioned in the region of the input opening.

Moreover, it is preferable to dispose a positioning element for positioning the cassette accommodated by the accommodation well a distance apart from the accommodation well in the vertical direction. The moving device is designed here such that it moves the cassette accommodated by the accommodation well and for reading out the storage phosphor plate located within it towards the positioning element. The positioning element is designed and/or positioned such that tilting of the next cassette over the positioning element is prevented. By means of the positioning element the cassette can be positioned securely and precisely in a desired position within the accommodation well. At the same time tilting of the next cassette, in particular when moving the next cassette out by means of the deflection element, over the positioning element is prevented and so reliable moving of the next cassette out of the path of movement is guaranteed.

Preferably the positioning element and the deflection element are spaced apart from one another in the vertical direction and are disposed substantially one over the other. This guarantees particularly secure positioning of the cassette.

Preferably the deflection element is disposed pivotably and/or moveably in the direction of stacking such that it can be pivoted or moved into or out of the path of movement. In this way the movement of the next cassette out of the path of movement of the cassette located within the accommodation well is supported. Furthermore, it can thus be guaranteed that the movement of the cassette located within the accommodation well is not impeded by the deflection element.

In one advantageous embodiment of the invention the deflection element can be pivoted or moved into a blocking position and into a passing position. It is designed and/or positioned here such that in its blocking position it blocks the path of movement predetermined by the accommodation well for the movement of the cassette located within the accommodation well, and in its passing position clears this path of movement. In this way it can advantageously be guaranteed that only a "legitimate" cassette can pass the deflection element.

Preferably with this embodiment the deflection element is designed and/or positioned such that when the cassette located within the accommodation well is moved due to contact between the cassette located within the accommodation well and the deflection element, the latter is brought out of its blocking position into its passing position. By means of this advantageous embodiment it can be guaranteed in a simple manner that the cassette itself located within the accommodation well clears the path of movement blocked by the deflection element.

In an alternative embodiment of this design of the invention, controls are provided for controlling the pivoting and movement of the deflection element into its blocking and passing position. By means of these so-called force controls pivoting or movement of the second deflection element is brought about.

The controls are preferably designed such that they control the pivoting or movement of the deflection element from its blocking position into its passing position dependently upon the cassette located within the accommodation well having reached a predetermined position when being moved. In particular, the predetermined position can be chosen such that the deflection element is brought into the passing position directly before the cassette located within the accommodation well reaches the second deflection element.

In one embodiment of the invention at least two deflection elements are provided for deflecting the next cassette located within the input unit. Here a first of the deflection elements is positioned and/or designed such that when moving the cassette located within the accommodation well and in which a storage phosphor plate still to be read out is located in a first horizontal direction as a result of contact between the cassette located within the accommodation well and the next cassette located within the input unit, a force is exerted upon the latter in the direction of stacking and thus moves the latter out of the path of movement. A second of the deflection elements is positioned and/or designed such that upon movement of the cassette located within the accommodation well, in which a storage phosphor plate which has already been read out is located, in a second horizontal direction which opposes the first horizontal direction, as a result of contact between the cassette located within the accommodation well and the next cassette located within the input unit a force is exerted upon the latter in the direction of stacking and said cassette is thus moved out of the path of movement. By means of this arrangement of the two deflection elements it can advantageously be guaranteed that the cassette located within the accommodation well, both when moved towards the input opening in order to read out the storage phosphor plate located within it, and also when moved away from the input opening after the storage phosphor plate located within it has been read out, is not impeded by the next cassette located within the input unit. The second deflection element ensures that the cassette, if applicable, at least partially projecting into the path of movement of the cassette located within the accommodation well, is moved out of the path of movement when the cassette located within the accommodation well is moved away from the input opening.

The first of the deflection elements is preferably fixed in position here. The second of the deflection elements is preferably disposed pivotably and/or moveably in the direction of stacking, as described in greater detail above.

In a further embodiment of the invention the moving device has a horizontally movable conveyor belt to which are attached two carriers for carrying, i.e. moving, the cassette accommodated by the accommodation well and which are spaced apart from one another over the length of the conveyor belt. The spacing is greater here than the largest width of the horizontal widths of the plurality of cassettes. By means of the carriers, which can be in the form of cams, movement of the cassette located within the accommodation well can be brought about particularly easily, cheaply and reliably. By means of the two carriers spaced apart from one another the cassette can be moved quickly and reliably in two opposing directions. The cassette is located here between the two carriers so that when moved in the one direction the one carrier, and when moved in the other, opposite direction, the other carrier comes into contact with the cassette. The two carriers are disposed on the conveyor belt, preferably in the form of an infinite belt, in particular out-of-phase by 180°.

In an advantageous further development of this embodiment the two carriers respectively have two individual partial carriers which are attached to the conveyor belt, directly adjacent to one another, over the length of the conveyor belt. Therefore, the two carriers are respectively in the form of double carriers. The individual partial carriers can in particular be in the form of cams or blocks. When the cassette located within the accommodation well is moved, the partial carrier resting against the cassette is therefore supported by the directly adjacent further partial carrier. This guarantees particularly reliable conveyance of the cassette. Furthermore, by means of this embodiment a small degree of deformation of the conveyor belt with horizontal movement of the cassettes can be guaranteed.

Advantageously, the conveyor belt in the form of an infinite belt is deflected by means of deflection rolls. This guarantees a compact arrangement of the moving device. By providing the carriers by means of the individual partial carriers, when the separate carriers run round the deflection rolls particularly low tension can be guaranteed in the conveyor belt. This guarantees a long service life as well as largely smooth synchronism of the conveyor belt.

In one advantageous embodiment of the invention a detecting device for detecting a rear-most cassette in the direction of stacking and which is not accommodated correctly by the accommodation well, and controls for controlling the horizontal movement of the conveyor belt are provided. The controls are designed such that they control successive movement of the conveyor belt and successive, horizontal movement of the rear-most cassette in the direction of stacking brought about by this in two opposing conveyance directions if the detecting device detects incorrect accommodation of the rearmost cassette in the direction of stacking by the accommodation well. This moving to and fro of the rearmost cassette in the direction of stacking in the two opposing conveyance directions means that the cassette is correctly accommodated by the accommodation well. This applies above all for relatively small cassettes which are pressed, in particular at a slant, towards the accommodation well by a stack of cassettes present within the input unit so that initially sliding of the cassette into the accommodation well is prevented by static friction forces. The detecting device can advantageously be a photo sensor.

Preferably the apparatus according to the invention has an output unit for outputting the plurality of cassettes which can be stacked one behind the other within the output unit, preferably in an opposite direction of stacking. In the output unit two pushing devices are provided, spaced apart from one another horizontally, which can be moved in the direction of stacking. The pushing devices bring about secure and stable forward movement of the cassettes located within the output unit, in particular of the rearmost cassette in the opposite direction of stacking. Actuation of the pushing device guarantees in a particularly easy way that a new cassette moved into the output unit can be added to the stack of cassettes located within the output unit at the rearmost position.

With this preferred embodiment of the invention controls for controlling the pushing devices are provided. These are designed such that they control sequential movement of the two pushing devices. With this sequential movement when the cassette located within the accommodation well is moved into the output unit they first of all move the pushing device positioned closer to the input unit moved in the direction of stacking in the opposite direction of stacking. They then move the pushing device spaced further apart from the input unit moved in the direction of stacking in the opposite direction of stacking. By means of the sequential movement of the two pushing devices in the direction of stacking the pushing devices are moved one after the other out of the path of movement of the cassette located within the accommodation well. Therefore the two pushing devices give way to the cassette pushing into the output unit. The moving device can be designed here such that it moves the cassette with the read out storage phosphor plate accommodated by the accommodation well into the output unit.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views unless specified to the contrary, the same reference numbers are used for the same elements or elements with the same effect. The drawings are not necessarily to scale; emphasis has instead been placed upon illustrating the principles of the invention. Of the drawings.

DETAILED DESCRIPTION OF THE PREFERRED EMBODIMENTS

Figure 1:
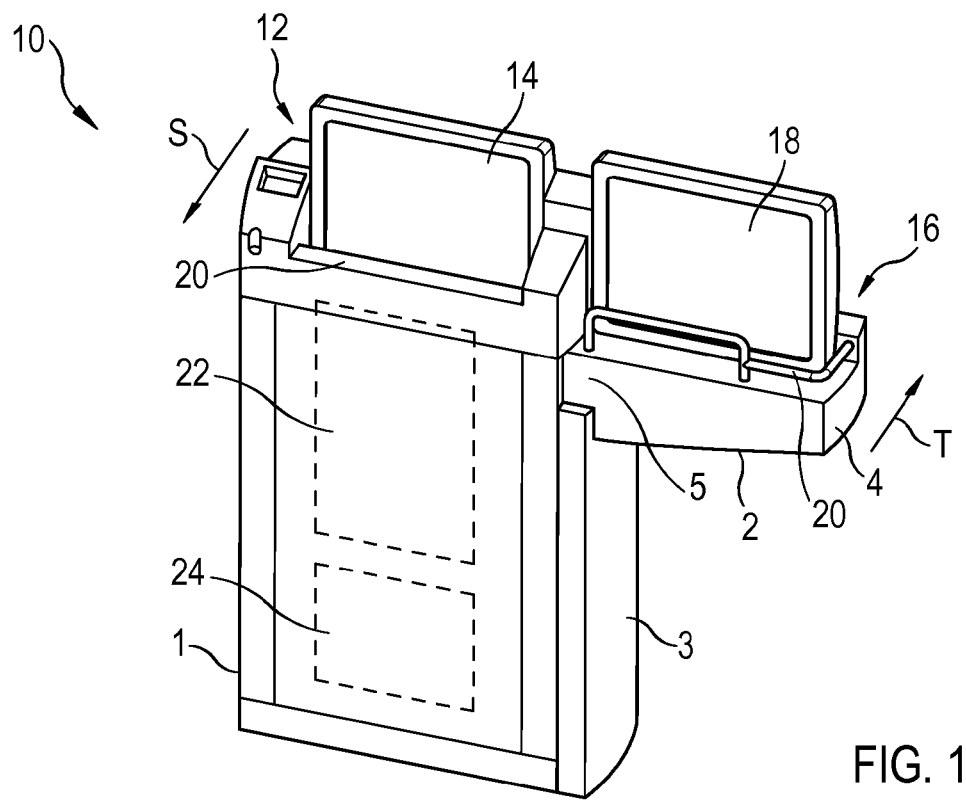
FIG. 1 is a diagrammatic illustration of an exemplary embodiment of an apparatus according to the invention for reading out X-ray information stored in storage phosphor plates.

FIG. 1 shows a diagrammatic illustration of an exemplary embodiment of an apparatus 10 according to the invention for reading out X-ray information stored in storage phosphor plates.

The apparatus 10 contains an input unit 12 for inputting a plurality of cassettes in which a storage phosphor plate to be read out is respectively located. The cassettes have respectively on one of their narrow face sides a closing which can be opened and closed in the apparatus 10. The cassettes are respectively stacked one behind the other in a direction of stacking S upright and with the closing positioned downwards into the input unit 12 by an operator.

In FIG. 1 a front cassette 14, as viewed in the direction of stacking S, can be seen in the input unit 12. Disposed directly next to the input unit 12 is an output unit 16 for outputting cassettes. In the output unit 16 the cassettes the storage phosphor plates of which have already been read out are stacked one behind the other. The cassettes are stacked in the output unit 16 in an opposite direction of stacking T which points in the opposite direction to the direction of stacking S.

In FIG. 1, a rear cassette 18, as viewed in the opposite direction of stacking T, is illustrated. The cassettes stacked in the output unit 16 can be removed by the operator and be used for a new X-ray. Both the input unit 12 and the output unit 16 are respectively provided with a bar 20 as edging on the operating side of the apparatus 10. In this way a cassette located within the input unit 12 or the output unit 16 can advantageously be prevented from falling out.

Beneath the input unit 12 there is within the apparatus 10 a read-out unit (22) (only indicated diagrammatically) in which the storage phosphor plate conveyed out of one of the cassettes and conveyed into the read-out unit 22 is read out in a way known in its own right and an image remaining in the storage phosphor plate after the read-out is deleted. After the storage phosphor plate has been read out the latter is conveyed back into the corresponding cassette. During the read-out process the cassette itself remains outside of the apparatus 10. The cassettes input into the apparatus 10 can advantageously have a RF (radio frequency) chip which is read out by an appropriate reading device before read-out of the storage phosphor plate. Various details regarding the cassette, in particular its format, or regarding the X-ray contained in the storage phosphor plate can be stored in the RF chip.

The apparatus 10 includes the control device 24—also only indicated diagrammatically—for controlling all necessary procedures and operations, said control device being connected to different components of the apparatus 10 to be controlled by it.

The input unit 12 and the read-out unit 22 are accommodated together in a first housing part 1 which stands on the floor. The output unit 16 is accommodated in a second housing part 2 which is disposed, self-supporting, in the side region 3 of the first housing part 1 and is in the form of an extension or side arm. In this way the apparatus 10 only requires one stand space for the first housing part 1, whereas no additional stand space is required for the second housing part 2.

The second housing part 2 in the form of an extension, has a distal end 4 and a proximal end 5 in relation to the first housing part 1, the height extending in a vertical direction and/or the depth extending perpendicularly to the latter of the distal end 4 being smaller than the height and the depth of the proximal end 5.

Figure 2:
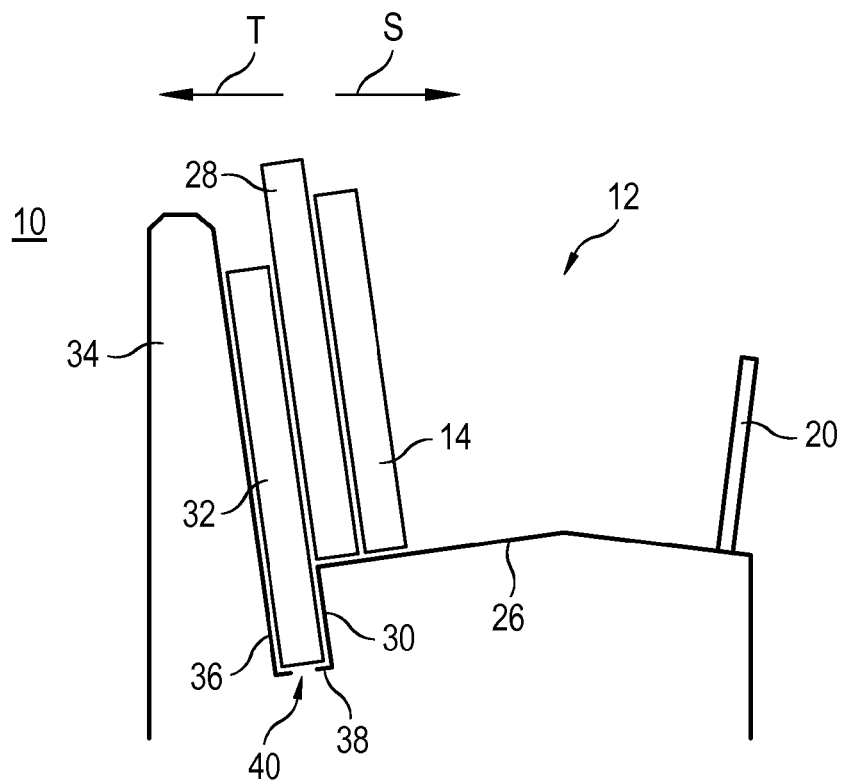
FIG. 2 is a diagrammatic sectional illustration of a side view of the apparatus with an input unit and a accommodation well.

FIG. 2 shows a diagrammatic sectional illustration of a side view of the input unit 12. The input unit 12 has an inclined surface 26 which is designed here to be inclined in relation to the horizontal in the direction of stacking S. In this way, the cassettes placed into the input unit 12 can slide in the opposite direction of stacking T due to their gravitational force. The incline of the inclined surface 26 in relation to the horizontal is preferably between 5° and 10°. In the example illustrated here there are two cassettes 14 and 28 in the input unit 12.

The apparatus 10 has an oblong accommodation well 30 adjacent to the inclined surface 26 of the input unit 12 in the opposite direction of stacking T for accommodating one of the plurality of cassettes which is preferably lowered by between 10 and 50 millimeters (mm) in relation to the inclined surface 26. The cassette located in the rearmost position on the inclined surface 26 slides largely independently into the accommodation well 30 due to the force of gravity if the latter is not already occupied by a cassette.

In the exemplary embodiment according to FIG. 2 a cassette 32 accommodated by the accommodation well 30 is shown. In the opposite direction of stacking T a rear wall 34 of the apparatus 10 is adjacent to the accommodation well 30. The rear wall 34 preferably extends continuously from the input unit 12 to the output unit 16 and has an inclined surface 36 which is inclined in relation to the vertical. In this way the cassettes 32, 28 and 14 located in the accommodation well 30 and in the input unit 12 can respectively lie with one of their wide sides stably resting against a rear wall 34. The inclines of the inclined surfaces 26, 36 preferably correspond to one another so that the two inclined surfaces 26, 36 are at a right angle to one another.

In a lower support surface 38 of the accommodation well 30 an input opening 40 is provided through which the storage phosphor plate, which is present in the cassette located within the accommodation well 30, can be conveyed to within the apparatus 10. The input opening 40 is oblong and slot-shaped in form, its length being at least as great as the corresponding length of the largest storage phosphor plate format to be read out in the apparatus 10. The width of the input opening 40 is chosen to be sufficiently large so that the storage phosphor plates are not impeded by the input opening 40 when being removed from the cassettes, even with small positional fluctuations. In the final position of the cassette 32 located within the accommodation well 30 the closing of the latter is located directly over the input opening 40.

Figure 3:
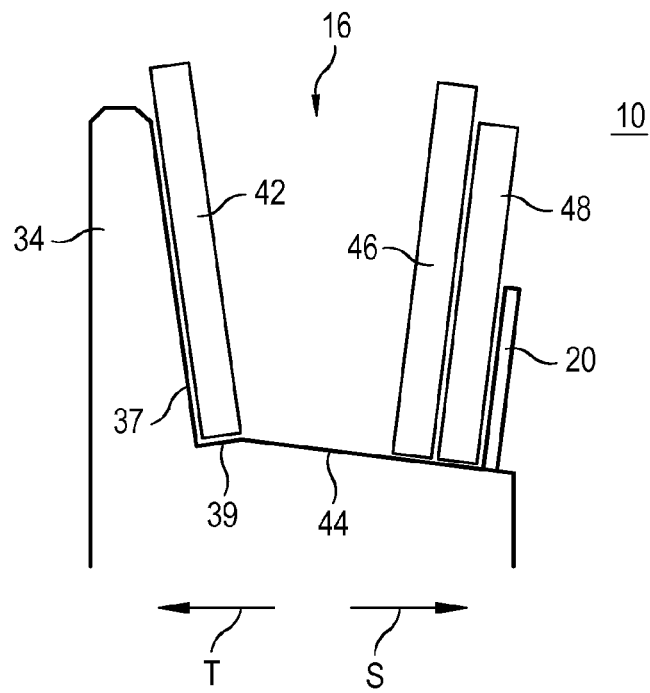
FIG. 3 is a diagrammatic sectional illustration of a further side view of the apparatus with an output unit.

FIG. 3 shows a diagrammatic sectional illustration of a further side view of the apparatus 10. Here the side view of the output unit 16 with the rear wall 34 can be seen. The rear wall 34 has an inclined surface 37 on which a cassette 42, in which a storage phosphor plate which has already been read out is located, lies flat. The cassette 42 has been pushed from the input unit 12 into the output unit 16 within the accommodation well 30 along the lower support surface 38 of the accommodation well 30 (see FIG. 2) and along a support surface 39 located within the output unit 16 which is aligned to the lower support surface 38 of the accommodation well 30, and in particular is adjacent to the latter. The inclined surface 37 of the rear wall 34 in the region of the output unit 16 is preferably disposed in alignment with the inclined surface 36 of the rear wall 34 in the region of the input unit 12.

The support surface 39 of the output unit 16 is of substantially the same width as the lower support surface 38 of the accommodation well 30 of the input unit 12, but does not lie in a shaft, but is directly adjacent to an inclined surface 44 which is inclined in relation to the horizontal in the direction of stacking S and slopes from a front edge of the support surface 39 to the front side of the output unit 16 from which an operator can remove cassettes 46, 48. By means of the slant of the inclined surface 44 cassettes output in the output unit 16 can slide due to their force of gravity over the inclined surface 44 to the bar 20 located in the region of the front side of the output unit 16. A stack of cassettes with storage phosphor plates which have already been read out is then formed here. Corresponding cassettes 46 and 48 are illustrated in FIG. 3.

Figure 4A:
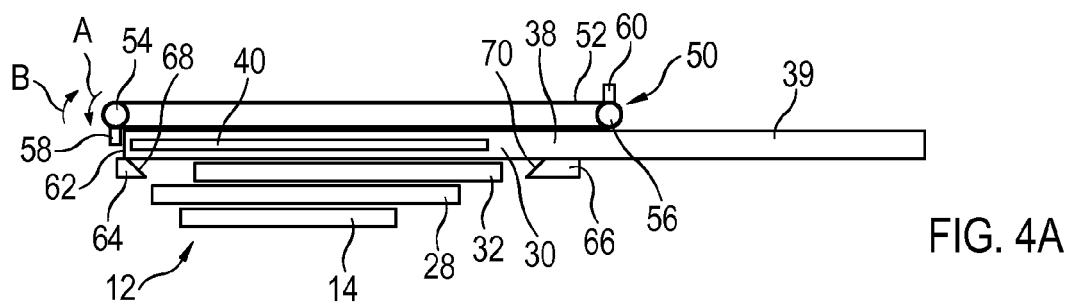
FIGS. 4A-C are diagrammatic illustrations of top views of the accommodation well and a moving device of the apparatus, two deflection elements spaced apart from one another being disposed at a cross-over from the accommodation well to the input unit.
Figure 4B:
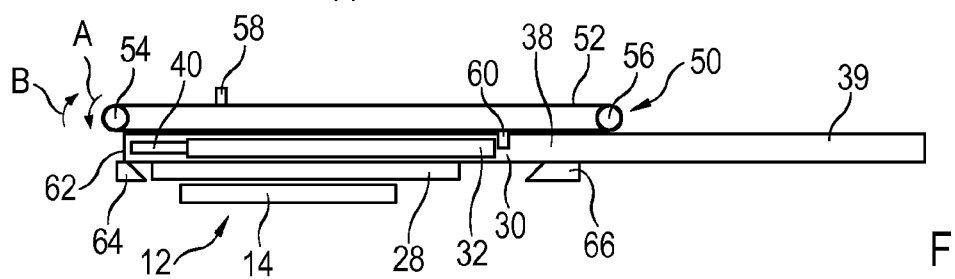
Figure 4C:
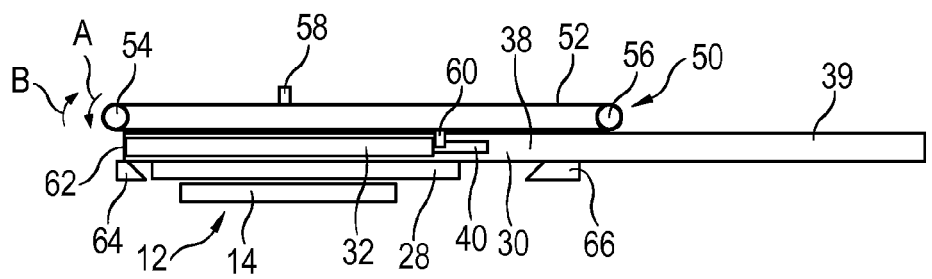

FIGS. 4A-C show diagrammatic illustrations of top views of the accommodation well 30 and a moving device 50 of the apparatus 10, the sequence of accommodation of the cassette 32 by the accommodation well 30 and positioning the cassette 32 accommodated by the accommodation well 32 by means of the moving device 50 being shown.

The moving device 50 serves to move the cassette 32 located within the accommodation well 30 horizontally along a path of movement. The moving device 50 is disposed in the rear wall 34 and has a conveyor belt 52 in the form of an infinite belt. The conveyor belt 52 is guided through two deflection rolls 54 and 56 spaced apart from one another horizontally. At least one of the deflection rolls 54, 56 is connected to a drive by means of which it can be rotated in two opposing conveyance directions A and B. The drive is connected to the control device 24. By means of the arrangement of the deflection rolls 54, 56 the conveyor belt 52 is in a tense state.

Two carriers are disposed on the conveyor belt 52 for carrying the cassette 32 located within the accommodation well. The carriers here are cams 58 and 60 which project perpendicularly outwards from the conveyance belt 52. The two cams 58, 60 are spaced apart from one another over the length of the conveyor belt 52. The distance between the two cams 58, 60 is greater here than the largest width of the horizontal widths of the cassettes to be read out in the apparatus 10.

In the present exemplary embodiment the distance between the two cams 58, 60 is substantially as great as the distance between the two deflection rolls 54, 56. In this way one of the cams 58, 60 faces towards the accommodation well 30, and the other of the cams 58, 60 faces away from the accommodation well 30. The cams 58, 60 are preferably substantially out-of-phase by 180°. The cam 58 is used in particular to move the cassette located within the accommodation well 30 in conveyance direction A. On the other hand, the cam 60 is used in particular to move the cassette located within the accommodation well 30 in conveyance direction B. Movement of the cassette is implemented by producing an active connection between the respective cam 58, 60 and one of the vertically extending narrow sides of the cassette.

FIG. 4A shows the cassettes 14, 28, 32 located within the input unit 12. In the situation illustrated the accommodation well 30 is clear and so the input opening 40 and the support surface 38 can be identified easily. Due to the slant of the inclined surface 26 the cassette 32 slides into the accommodation well 30 and comes to rest on the support surface 38. This is illustrated in FIG. 4B in which the cassette 32 is located within the accommodation well 30.

In the situation according to FIG. 4B the conveyor belt 52, starting from the situation illustrated in FIG. 4A, has been moved in conveyance direction B. The cam 60 is actively connected to the right-hand narrow side of the cassette 32. By conveying the conveyor belt 52 further the cassette 32 is moved horizontally over the support surface 38 in conveyance direction B until it strikes a stop 62 located within the accommodation well 30. This situation is illustrated in FIG. 4C. The stop 62 is disposed in a peripheral region of the accommodation well 30 such that the closing of the cassette 32 lies precisely over the input opening 40 when it strikes the stop 62.

A clamping mechanism (not shown) for securely clamping the cassette 32 positioned within the accommodation well 30 is lowered into the base of the accommodation well 30. This clamping mechanism is moved out of the base in order to securely clamp the cassette. After reading out the storage phosphor plate contained in the cassette and conveying the latter into the positioned cassette, the clamping mechanism is lowered into the base again in order to move the cassette into the output unit 16. The clamping mechanism preferably contains a fault identification mechanism if a cassette to be clamped is not correctly accommodated by the accommodation well 30. By means of the fault identification mechanism foreign bodies or incorrectly input cassettes for example can also be identified.

The clamping mechanism is not described in the present application any further. As regards the disclosure of the clamping mechanism, reference is made to the relevant disclosure content of European Patent Application EP 1 640 800 A1 which is herewith incorporated into the disclosure content of the present application. This also applies in particular to the description of the light-proof closure of the securely clamped cassette.

In FIGS. 4A-C two deflection elements 64 and 66, spaced apart from one another horizontally, are disposed at a crossover from the accommodation well 30 to the input unit 12. The deflection element 64 here is directly adjacent to the stop 62 in the peripheral region of the accommodation well 30. Preferably the stop 62 and the deflection element are connected to one another integrally so that the deflection element 64 forms part of the stop 62. The deflection element 66 is disposed at a crossover from the input unit 12 to the output unit 16, i.e. at an egress from the input unit 12.

The deflection elements 64, 66 serve to deflect the next cassette 28 located within the input unit and which is adjacent to the cassette 32 accommodated by the accommodation well 30 when the next cassette 28 projects at least partially into the path of movement of the cassette 32. In the example illustrated the deflection elements 64, 66 have a slanted guide region 68 and 70 for guiding the next cassette 28 in the direction of stacking S. The surfaces of the guide regions 68, 70 are advantageously provided with a material which guarantees a low friction coefficient when the next cassette 28 is deflected between this and the guide regions 68, 70.

Figure 5A:
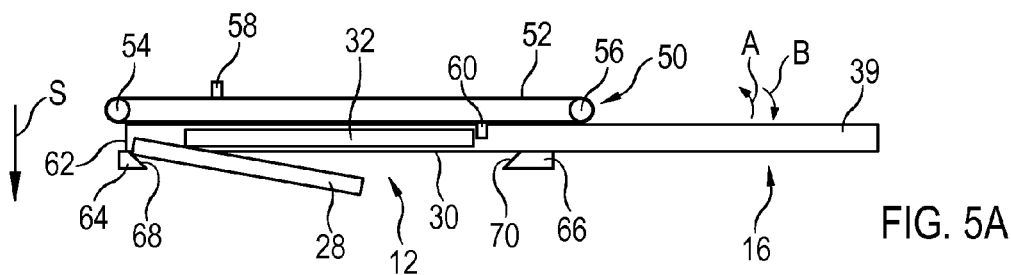
FIGS. 5A-C are further diagrammatic illustrations of top views of the accommodation well and the moving device of the apparatus with an illustration of the mode of operation of the left-hand deflection element.
Figure 5B:
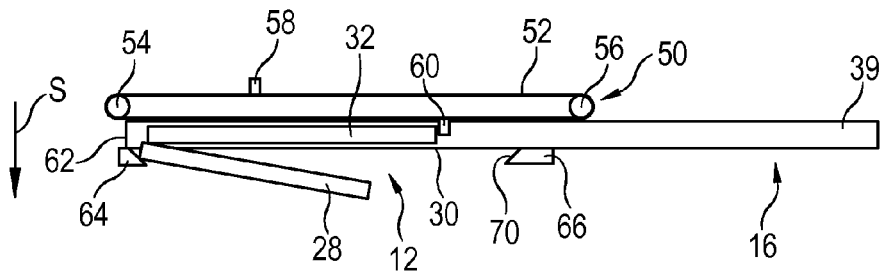
Figure 5C:
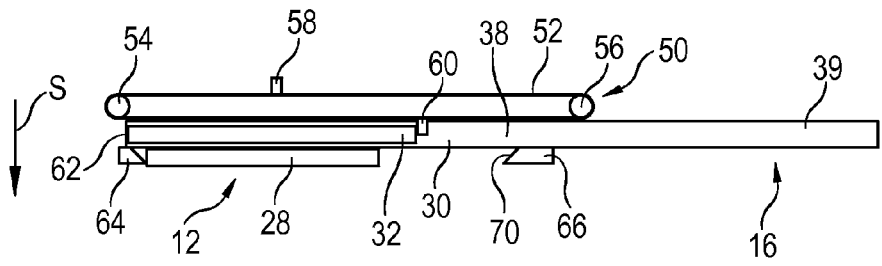

FIGS. 5A-C are intended to illustrate the mode of operation of the left-hand deflection element 64. FIG. 5A shows a situation in which the next cassette 28 located within the input unit 12 partially projects into the path of movement of the cassette 32 located within the accommodation well 30. The movement of the cassette 32 towards the stop 62 is therefore impeded by the cassette 28. By moving the cassette 32 in conveyance direction B the cassette 32 inevitably comes into contact with the cassette 28. The latter is clamped between the cassette 32 and the deflection element 64. By further moving the cassette 32 by means of the moving device 50 a force is exerted upon the cassette 28 in the direction of stacking S. In this way the cassette 28 is moved out of the path of movement of the cassette 32 due to the guidance through the guide region 68 of the deflection element 64. This is illustrated in FIG. 5B. The clamped narrow side of the next cassette 28 moves along the guide region 68, and the narrow side lying opposite the clamped narrow side moves in the opposite direction of stacking T. FIG. 5C shows a situation in which the cassette 28 is totally removed from the path of movement of the cassette 32 and lies parallel to and flat on the cassette 32 already positioned against the stop 62 within the accommodation well.

Figure 6A:
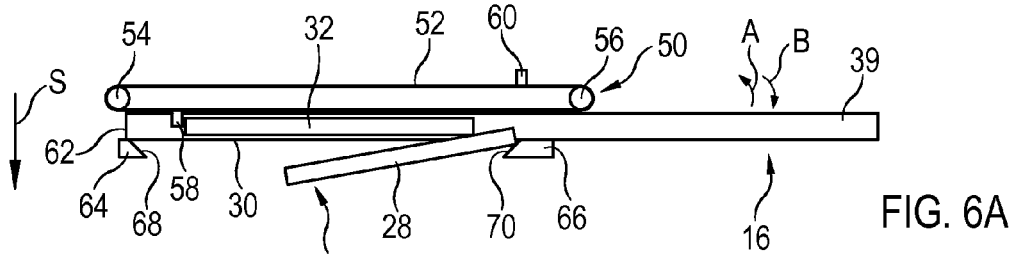
FIGS. 6A-C are further diagrammatic illustrations of top views of the accommodation well and the moving device of the apparatus with an illustration of the mode of operation of the right-hand deflection element.
Figure 6B:
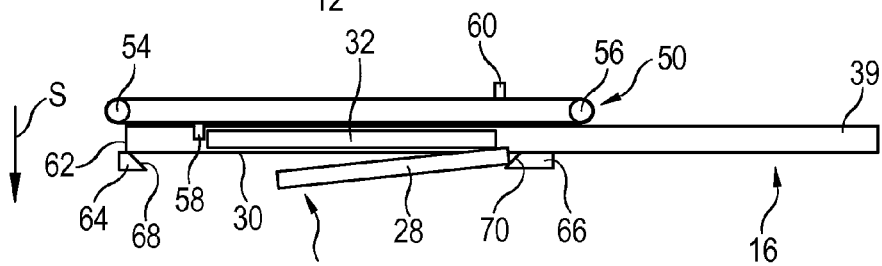
Figure 6C:
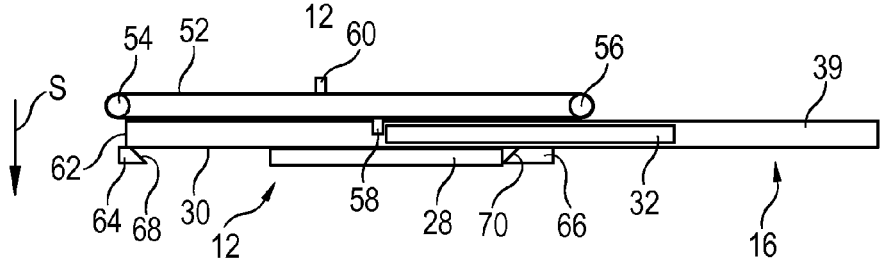

FIGS. 6A-C are intended to illustrate the mode of operation of the right-hand deflection element 66. This mode of operation largely corresponds to that of the left-hand deflection element 64, and so it does not need to be described in any greater detail here. With the present exemplary embodiment according to FIGS. 6A-C the cassette 32 located within the accommodation well 30, the storage phosphor plate of which has already been read out, is moved along the accommodation well 30 towards the output unit 16. Its path of movement is blocked here by the cassette 28. In FIG. 6C one can see how the cassette 32 passes the right-hand deflection element 66 and is conveyed into the output unit 16.

In the exemplary embodiments described above by means of FIGS. 5A-C and 6A-C the deflection elements 64, 66 have slanted guide regions 68 and 70. It is also possible to provide the deflection elements 64, 66 with guide regions which are different in form. For example, deflection elements 64, 66 can have rounded guide regions. It is also possible to provide the deflection elements 64, 66 with guide regions which are different in design.

Figure 7A:
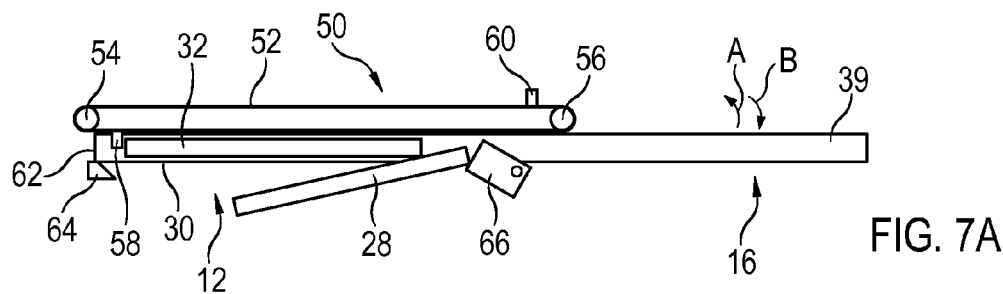
FIGS. 7A-D are diagrammatic illustrations of top views of the accommodation well and the moving device of the apparatus with an illustration of the mode of operation of a further, right-hand deflection element which can be pivoted into a blocking and a passing position.
Figure 7B:
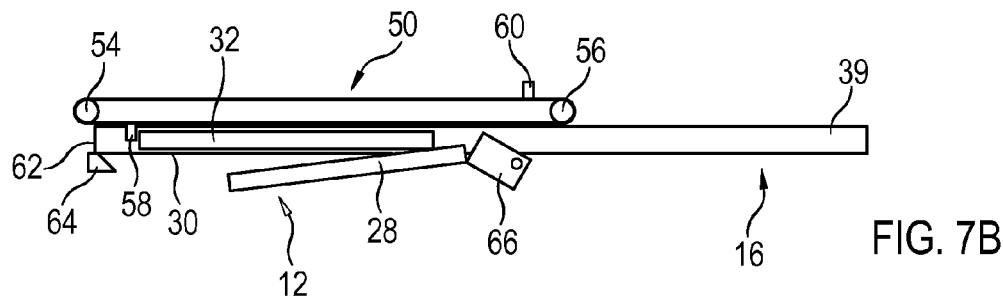
Figure 7C:
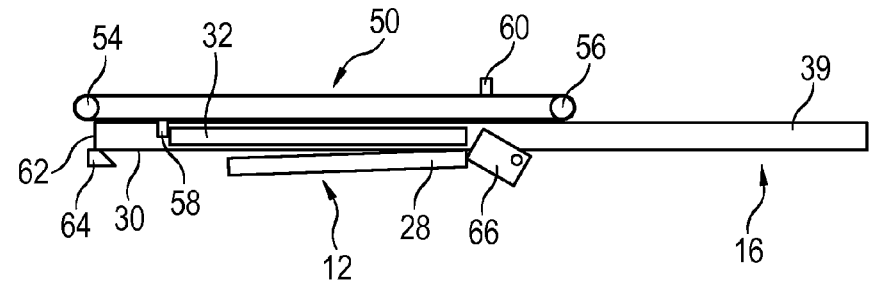
Figure 7D:
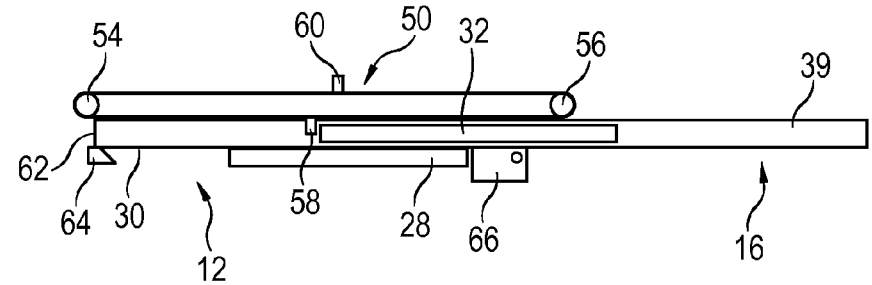

FIGS. 7A-D show diagrammatic illustrations of top views of the accommodation well 30 and the moving device 50 of the apparatus 10. In the exemplary embodiment chosen here the right-hand deflection element 66 is rectangular in form. Moreover, it can be pivoted into a blocking and a passing position. In the blocking position it blocks the path of movement of the cassette 32 located within the accommodation well into the output unit 16. In FIGS. 7A-C the deflection element 66 is located in this blocking position. In the passing position the deflection element 66 has been moved out of the path of movement of the cassette 32. This is illustrated in FIG. 7D. Therefore, the deflection element 66 constitutes a type of gateway for the crossover to the output unit 16.

The deflection element 66 which can be pivoted into the blocking and passing position can be designed such that the cassette 32 moved in conveyance direction A towards the output unit 16 brings the deflection element into its passing position due to contact taking place with the deflection element 66 and so clears the path of movement. Alternatively the deflection element 66 can be controlled by the control device 24 such that it is brought from the blocking into the passing position by means of a drive. This can preferably take place shortly before the arrival of the cassette 32 upon reaching a predetermined movement position of the cassette 32. In this way it can be guaranteed that before pivoting into the passing position a cassette, if applicable, projecting into the path of movement, is conveyed out of the latter.

Figure 8A:
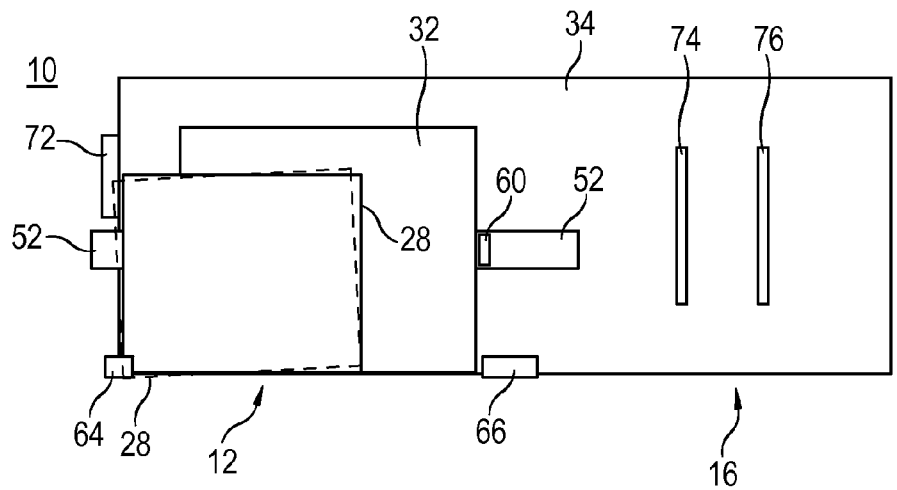
FIGS. 8A-B are diagrammatic illustrations of front views of a rear wall of the apparatus.
Figure 8B:
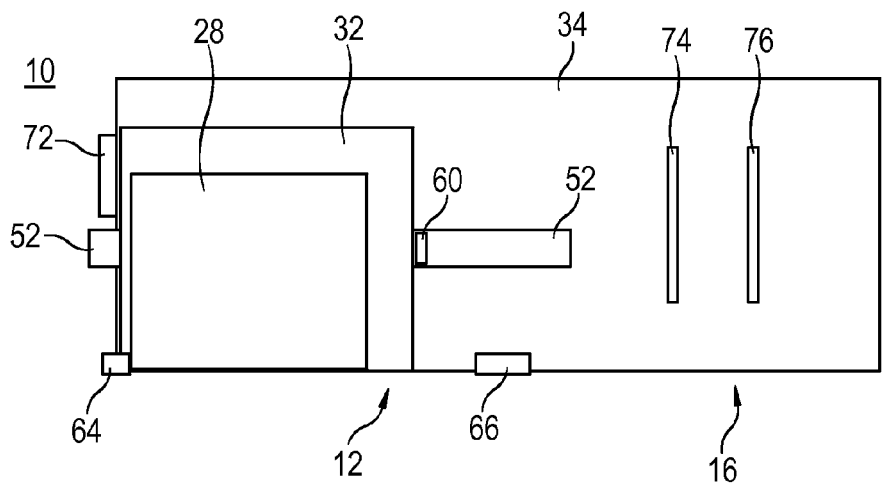

FIGS. 8A, B show diagrammatic illustrations of front views of the apparatus 10. The front views show a view of the rear wall 34. In FIGS. 8A, B one can see a positioning element 72 which is disposed above the accommodation well 30 and over the deflection element 64. The positioning element 72 serves here on the one hand for the precise horizontal positioning of the cassette 32 located within the accommodation well 30 and on the other hand guarantees reliable moving of the next cassette 28 out of the path of movement, tilting of the cassette 28 over the positioning element 72—as shown by dashed lines in FIG. 8A—being prevented. The result is illustrated in FIG. 8B which shows the cassette 32 located within the accommodation well and aligned on the positioning element 72 and the next cassette 28 moved with a high degree of reliability out of the path of movement and now aligned parallel to the cassette 38.

Furthermore, FIGS. 8A, B show two pushing devices 74 and 76 spaced apart from one another horizontally in the rear wall 34 of the output unit 16. The pushing devices 74, 76 can be moved in the direction of stacking S and so can move a cassette located in front of them in the direction of stacking S in the direction of stacking S. Said cassette in this way reaches the inclined surface 3 44 of the output unit and slides towards the bar 20 of the output unit 16 (see FIG. 3). The pushing devices 74, 76 are connected to the control device 24 which controls operation of the latter. When moving a cassette located within the accommodation well 30 into the output unit 16 the control device 24 controls a sequential movement of the pushing devices 74, 76.

Figure 9A:
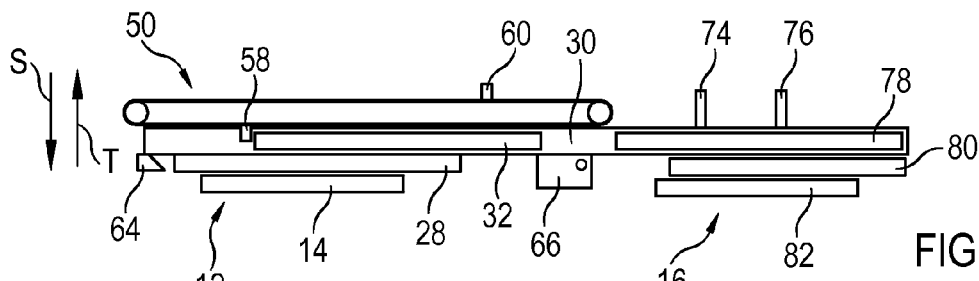
FIGS. 9A-D are diagrammatic illustrations of top views of the accommodation well, the moving device and an output unit of the apparatus with an illustration of the mode of operation of pushing devices disposed in the rear wall of the output unit.
Figure 9B:
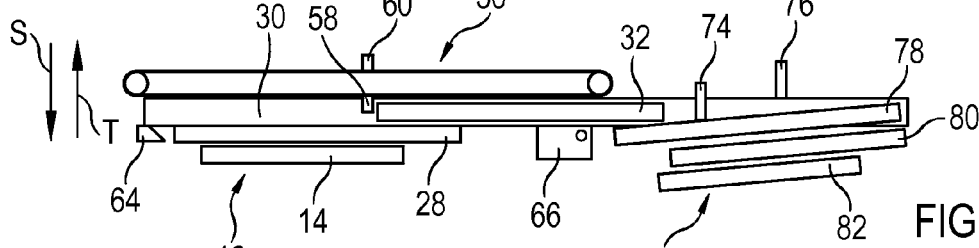
Figure 9C:
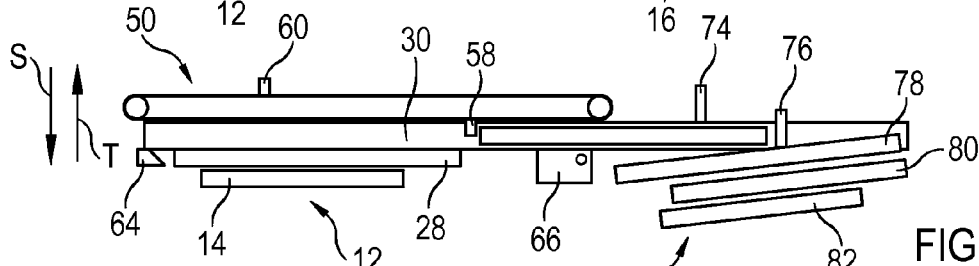
Figure 9D:
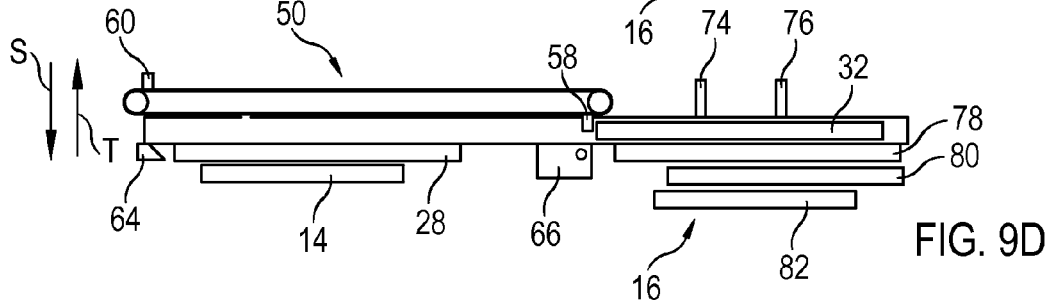

This is illustrated in greater detail in FIGS. 9A-D. With the sequential movement of the pushing devices 74, 76, when moving the cassette 32 located within the accommodation well 30 the pushing device 74 positioned more closely to the input unit 12 is first of all moved in the direction of stacking S. Cassettes 78, 80, 82 already located within the output unit 16 are moved in the direction of stacking S. This can be seen in FIG. 9B. The cassette 32 can then be moved into the output unit 16. The pushing element 76 spaced further apart from the input unit 12 is then moved in the direction of stacking S. At the same time or afterwards the pushing element 74 is moved back in the opposite direction of stacking T. The cassette 32 can then be moved past the pushing device 74 further into the output unit 16. This is illustrated in FIG. 9C. Finally, the pushing device 76 is then also moved back in the opposite direction of stacking T. The cassette 32 can then be moved fully into the output unit 16. This is illustrated in FIG. 9D.

Figure 10A:
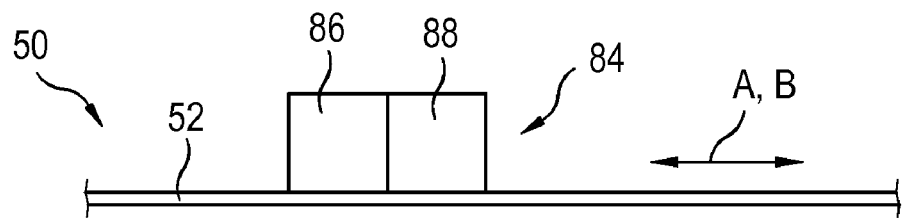
FIGS. 10A-C are diagrammatic illustrations of a first side view, of a top view and of a second side view of a conveyor belt of the moving device with a double cam as the carrier which has two individual cams as partial carriers.
Figure 10B:
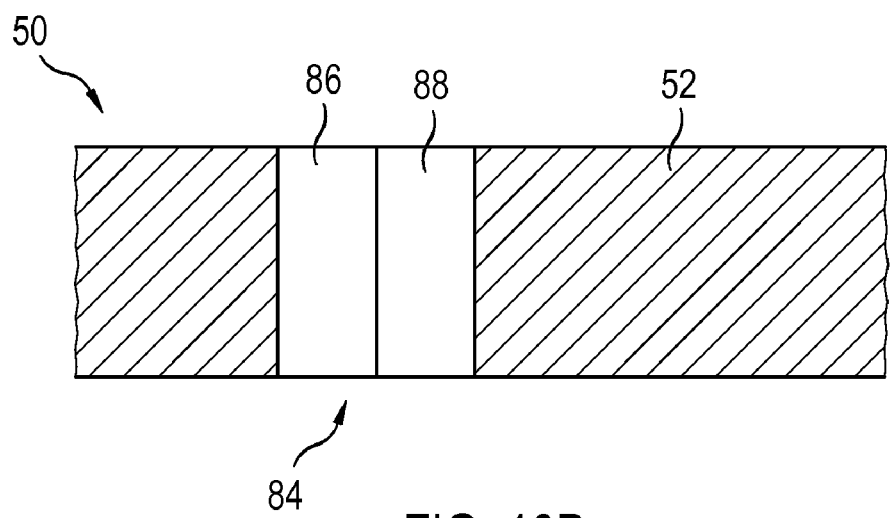
Figure 10C:
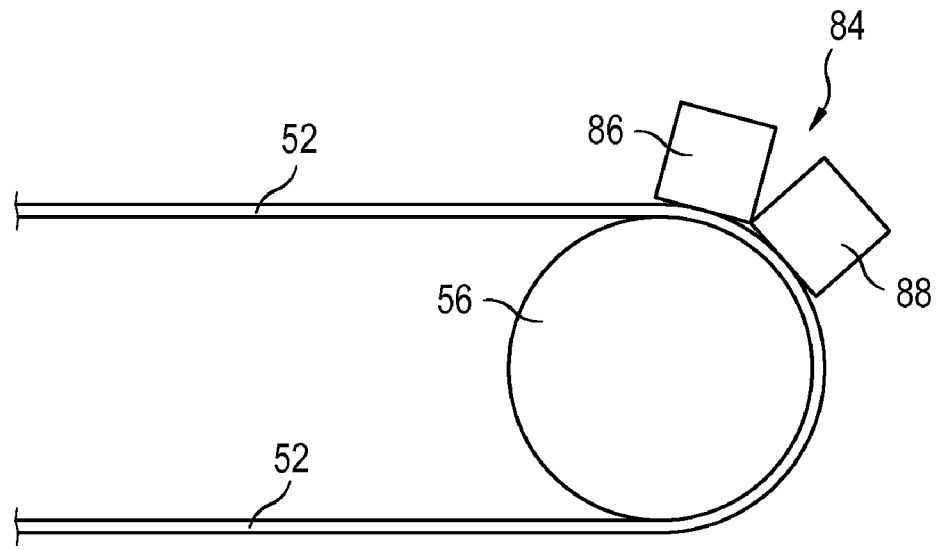

FIGS. 10A-C show different views of the conveyor belt 52 of the moving device 50 with a so-called double cam 84 as a carrier which has two individual cams 86, 88 as partial carriers. The two cams 86, 88 are separated from one another and are attached directly adjacent to one another on the conveyor belt 52 over the length of the conveyor belt 52.

FIG. 10A shows a first side view, FIG. 10B a top view, and FIG. 10C a second side view of the conveyor belt 52 together with the individual cams 86, 88. In FIG. 10C the deflection roll 56 and the situation in which the double cam 84 is conveyed around the deflection roll 56 are additionally illustrated. The two individual cams 86, 88 are separated from one another by the curve in the deflection roll 56 as viewed in conveyance direction B.

With the double cam 84 the individual cam 86 or 88 which rests against the cassette to be moved is supported by the respective other of the two cams 86 or 88. The conveyor belt 52 is therefore not so greatly deformed when the cassette is moved. When deflecting the double cam 84 its passage around the deflection roll 56 takes place almost without any tension or jolts. Advantageously both carriers 58, 60 are designed in the form of this type of double cam 84.

Figure 11:
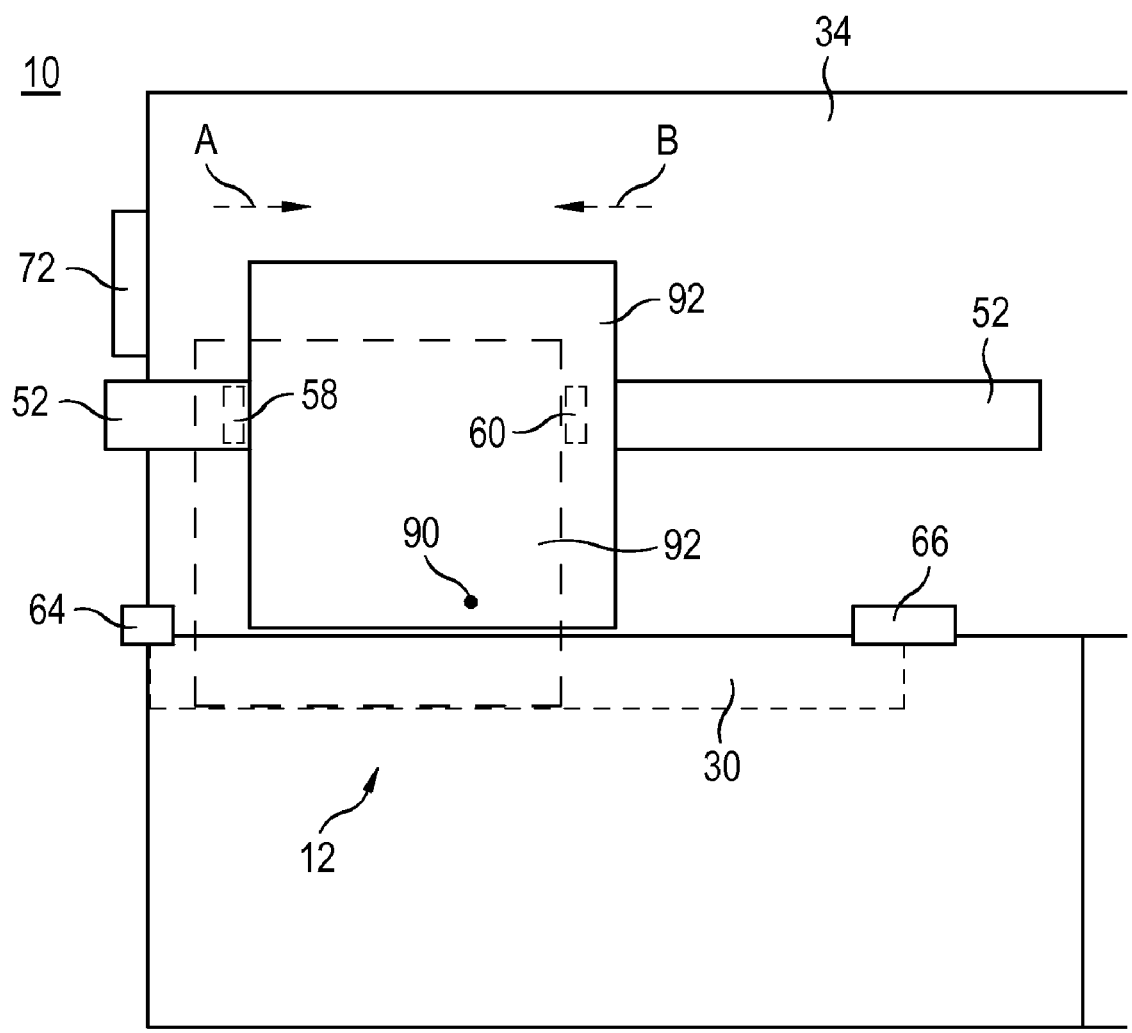
FIG. 11 is a diagrammatic illustration of a further front view of the rear wall of the apparatus with a detecting device disposed in the rear wall.

FIG. 11 shows a diagrammatic illustration of a further front view of the rear wall 34 of the apparatus 10. There is a detecting device 90 here in the rear wall 34 for detecting a cassette 92 accommodated incorrectly by the accommodation well 30 and which is rearmost in the direction of stacking S. This detecting device 90 can in particular be provided in the form of a photo sensor or a push button.

The detecting device 90 is connected to the control device 24 which processes the information established by the detecting device in order to ascertain correct accommodation of the cassette 92. If the detecting device 90 detects a cassette 92 accommodated incorrectly in the accommodation well 30 the control device 24 controls the moving device 50 such that the latter moves the cassette 92 to and fro in both conveyance directions A and B. Here the moving device 50 implements at least temporary successive movement of the conveyor belt 52 in the two opposing conveyance directions. By means of this movement to and fro it is possible for the cassette 92 to finally slide into the accommodation well 30 and to be moved and correctly aligned here.

FIG. 11 shows the cassette 92 in a situation in which it is not correctly accommodated by the accommodation well 30. The cassette 92 is located above the accommodation well 30. By means of the cam 58 the cassette 92 is therefore moved temporarily to the right in conveyance direction A. This situation is illustrated with solid lines in FIG. 11. After the cassette 92 has been moved temporarily in conveyance direction A the control device 24 controls a change in the conveyance direction and moves the conveyor belt 52, and so the cassette 92, in conveyance direction B. In this way the cam 60 moves the cassette 92 back to the left in conveyance direction B. In this way the cassette 92 is caused to fall or slide into the accommodation well 30. This situation is illustrated with dashed lines in FIG. 11. The cassette 92 is then located within the accommodation well 30 and can—as already explained in greater detail above—be moved towards the positioning element 72 and be aligned horizontally to the latter.

In order to further improve the conveyance of the cassettes into the accommodation well 30, an actively operated feed roll (not shown) can be disposed in the rear wall 34 or in the inclined surface 26 (see FIG. 2) with which the rearmost cassette 92 in the direction of stacking S can be pulled into the accommodation well 30. It is also possible to design the feed roll so that a stack of cassettes which, if applicable, presses down on the cassette 92, is pushed back a little in the direction of stacking S in order to relieve the cassette 92.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for reading out X-ray information stored in storage phosphor plates, comprising:
    an input unit in which a plurality of cassettes, in which a storage phosphor plate to be read out is respectively located, can be stacked one behind the other in a direction of stacking,
    an oblong accommodation well for accommodating one of the cassettes, the accommodation well being adjacent to the input unit and having an oblong input opening through which the storage phosphor plate, which is located in the cassette accommodated by the accommodation well, can be conveyed to within the apparatus,
    a moving device for horizontally moving the cassette located within the accommodation well along a path of movement, and
    a deflection element for deflecting a next cassette, said next cassette being located within the input unit and projecting at least partially into the path of movement, the deflection element being positioned and/or designed such that by a horizontal movement of the cassette located within the accommodation well along the path of movement a force is exerted upon the next cassette causing the next cassette to move in the direction of stacking due to a contact between the cassette located within the accommodation well and the next cassette projecting at least partially into the path of movement so that the latter is moved out of the path of movement.

2. The apparatus according to claim 1, wherein the deflection element is disposed in a transition region between the input unit and the accommodation well.

3. The apparatus according to claim 1, wherein the deflection element has a slanted guide region for guiding the next cassette located within the input unit out of the path of movement.

4. The apparatus according claim 1, wherein the deflection element is disposed in a peripheral region of the accommodation well.

5. The apparatus according claim 1, further comprising a positioning element for positioning the cassette accommodated by the accommodation well being provided above the deflection element and the positioning element preventing tilting of the next cassette projecting into the path of movement over the positioning element.

6. The apparatus according claim 1, wherein the deflection element is disposed pivotably and/or moveably and is pivotable or moveable into the path of movement or out of the path of movement.

7. The apparatus according to claim 6, wherein the deflection element is pivotable or moveable into a blocking position and into a passing position, and, when in a blocking position, the deflection element blocks the path of movement for the movement of the cassette located within the accommodation well and, when in a passing position, the deflection element clears this path of movement.

8. The apparatus according to claim 7, wherein the deflection element is brought out of its blocking position and into its passing position when the cassette located within the accommodation well is moved due to contact between the cassette and the deflection element.

9. The apparatus according to claim 6, further comprising controls for controlling the pivoting and movement of the deflection element into its blocking position and passing position, and the controls being designed such that the pivoting and movement of the deflection element from its blocking position into its passing position is controlled dependently upon the cassette located within the accommodation well having reached a predetermined position when being moved.

10. The apparatus according claim 1, wherein the moving device comprises a horizontally movable conveyor belt to which are attached two carriers for carrying the cassette accommodated by the accommodation well, which are spaced apart from one another over the length of the conveyor belt by a distance which is greater than the largest width of the horizontal widths of the plurality of cassettes.

11. The apparatus according to claim 10, wherein at least one of the two carriers has two individual partial carriers which are attached to the conveyor belt and which are directly adjacent to one another.

12. The apparatus according claim 1, further comprising:
an output unit for outputting the plurality of cassettes which can be stacked one behind the other within the output unit, an opposite direction of stacking, and
two pushing devices, spaced apart from one another horizontally, being provided in the output unit, said pushing devices capable of moving in the direction of stacking.

13. The apparatus according to claim 12, further comprising controls for controlling the pushing devices, and the controls controlling sequential movement of the two pushing devices, wherein when moving the cassette located within the accommodation well into the output unit, the controls first move the pushing element, positioned closer to the input unit, in direction of stacking and then move the pushing element, positioned further away from the input unit and moved in direction of stacking in the opposite direction of stacking.

14. An apparatus for reading out X-ray information stored in storage phosphor plates, comprising:
an input unit in which a plurality of cassettes, in which a storage phosphor plate to be read out is respectively located, can be stacked one behind the other in a direction of stacking;
an oblong accommodation well for accommodating one of the cassettes, the accommodation well being adjacent to the input unit and having an oblong input opening through which the storage phosphor plate, which is located in the cassette accommodated by the accommodation well, can be conveyed to within the apparatus;
a moving device for horizontally moving the cassette located within the accommodation well along a path of movement, wherein the moving device comprises a horizontally movable conveyor belt to which are attached two carriers for carrying the cassette accommodated by the accommodation well, which are spaced apart from one another over the length of the conveyor belt by a distance which is greater than the largest width of the horizontal widths of the plurality of cassettes;
a deflection element for deflecting a next cassette, said next cassette being located within the input unit and projecting at least partially into the path of movement, the deflection element being positioned and/or designed such that by a horizontal movement of the cassette located within the accommodation well along the path of movement a force is exerted upon the next cassette in the direction of stacking due to a contact between the cassette located within the accommodation well and the next cassette projecting at least partially into the path of movement so that the latter is moved out of the path of movement;
a detecting device for detecting a rear-most cassette in the direction of stacking, said rear-most cassette not being accommodated correctly by the accommodation well, and
controls for controlling the horizontal movement of the conveyor belt, the controls controlling a successive movement of the conveyor belt causing a horizontal movement of the rear-most cassette in two opposing conveyance directions if the detecting device detects incorrect accommodation of the rearmost cassette in the direction of stacking by the accommodation well.

15. A method for reading out X-ray information stored in storage phosphor plates, comprising:
stacking a plurality of cassettes, in which a storage phosphor plate to be read out is respectively located, in an input unit, one behind the other in a direction of stacking,
accommodating one of the cassettes in an oblong accommodation well that is adjacent to the input unit;
conveying a storage phosphor plate in the cassette accommodated by the accommodation well through an oblong input opening in the accommodation well;
horizontally moving the cassette located within the accommodation well along a path of movement, and
deflecting a next cassette, said next cassette being located within the input unit and projecting at least partially into the path of movement, out of the path of movement by exerting a force upon the next cassette causing the next cassette to move in the direction of stacking due to contact between the cassette located within the accommodation well and the next cassette.

* * * * *